United States Patent [19]
Eguchi et al.

[11] Patent Number: 5,835,474
[45] Date of Patent: Nov. 10, 1998

[54] DISK DEVICE CONFIGURED TO PREVENT CONTACT BETWEEN THE DISK AND THE DISK DRIVE MOTOR

[75] Inventors: Takaharu Eguchi; Shigeki Asai; Takayuki Niioka; Tatsunori Fujiwara; Masaki Kobayashi, all of Tokyo, Japan

[73] Assignee: Mitsubishi Denki Kabushiki Kaisha, Tokyo, Japan

[21] Appl. No.: 848,996

[22] Filed: May 2, 1997

[30] Foreign Application Priority Data

Oct. 25, 1996 [JP] Japan ................................. 8-284095

[51] Int. Cl.$^6$ ..................................................... G11B 23/00
[52] U.S. Cl. ............................................................. 369/263
[58] Field of Search ................................. 369/75.2, 75.1, 369/77.1, 77.2, 263

[56] References Cited

FOREIGN PATENT DOCUMENTS 2193372  7/1990  Japan .
2-235281  9/1990  Japan .

*Primary Examiner*—Stuart S. Levy
*Assistant Examiner*—David D. Davis

[57] ABSTRACT

A disk device includes a chassis, a replay unit for supporting a disk placed within the chassis, rotating the disk, and reading data from the rotating disk, a vibration-isolating unit for holding the replay unit by connecting the replay unit to the chassis and for isolating the replay unit from vibrations, a carrying unit for carrying the disk between a disk inlet and outlet formed on the chassis and a replay position where the disk is to be fixed in the replay unit, a motor for driving the carrying unit, and a flexible printed circuit (FPC). The FPC is mounted to one lateral surface of the motor and is electrically connected to the motor. The FPC has a projecting portion which projects from an upper surface of the motor toward one surface of the disk fixed in the replay unit. The projecting portion of the FPC is adapted to be brought into contact with the disk to prevent the disk from coming into contact with the motor when the disk moves closer to the motor.

6 Claims, 4 Drawing Sheets

DISK DEVICE CONFIGURED TO PREVENT CONTACT BETWEEN THE DISK AND THE DISK DRIVE MOTOR

BACKGROUND OF THE INVENTION

1. Field of the Invention

The present invention relates to a disk device able to prevent a disk placed therein from being scratched by a contact between the disk and a motor.

2. Description of the Prior Art

Referring now to FIG. 7, there is illustrated a sectional side view in elevation of a prior art disk device. In the figure, reference numeral 1 denotes a chassis in which internal components of the disk device are mounted, and 2 denotes a replay unit mounted within the chassis 1, which serves to hold a disk 6 in a rotatable state and includes a first motor not shown in the figure for rotating the disk 6 and an optical pickup not shown in the figure for reading data from the disk 6 rotating. Furthermore, each of reference numerals 3 and 4 denotes a vibration-isolating member comprised of a spring and a damper. The vibration-isolating members 3 and 4 connect the chassis 1 to the replay unit 2. During a replay of the disk 6, the isolating members 3 and 4 can hold the replay unit 2 in a state in which the replay unit can move within a certain limit defined by the vibration-isolating members 3 and 4. This prevents outside vibrations from reaching the replay unit 2. At all other cases, the replay unit 2 is secured to the chassis 1 by a locking system not shown in the figure.

In addition, reference numeral 5 denotes a turn table which is located in the vicinity of the center of the replay unit. The turn table 5 holds the disk 6 in cooperation with a damper 8 while the center of the turn table 5 is coincident with the center of the disk 6. Then, the turn table 6 that is driven by the motor rotates the disk 6. The disk 6 is shaped like a circle and has a recording surface which contains recording tracks which serve as a storage area. Furthermore, reference numeral 7 denotes a damper arm rotatably fixed to a supporting shaft disposed at one end of the replay unit 2. The damper 8 that is loosely engaged in the damper arm 7 can sandwich the disk 5 between the damper 8 and the turn table 5 so as to hold the disk 6 in a rotatable state.

Reference numeral 9 denotes a second motor for driving a carrying unit not shown in the figure for carrying the disk 6 from a disk inlet and outlet onto the turn table 5 when replaying the disk 6, and carrying the disk to the disk inlet and outlet following the completion of the replay. The motor 9 can also actuate a cam not shown of the locking system during at the completion of the transport of the disk 6 onto the turn table 5 so as to release the locked state of the replay unit 2. Furthermore, reference numeral 10 denotes a cushion secured to an upper surface of the motor 9, 11 denotes a circuit board including a control circuit used for controlling the disk device, and 12 denotes a lead line for supplying power from the circuit board 11 to the motor 9. The motor 9 is located under the disk 6 sandwiched between the damper 8 and the turn table 5 so that the disk 6 covers the motor 9.

Referring next to FIG. 8, there is illustrated a sectional side view of the prior art disk device in a state wherein vibrations that cause the replay unit 2 to move in the direction shown by the arrow A are applied to the disk device. The vibrations cause the cushion 10 secured to the motor 9 to come into contact with the recording surface of the disk 6.

In operation, when the disk 6 is inserted via the disk inlet and outlet, the carrying unit that is driven by the motor 9 carries the disk 6 to a predetermined position on the turn table 5. Then, when disk 6 is fixed at the predetermined position on the turn table 5, the motor 9 drives the cam of the locking system so as to release the locked state of the replaying unit in which it is secured to the chassis 1. As the same time that the replay unit 2 is released from its locked state wherein it is secured to the chassis 1, the clamper 8 holds the disk 6 in cooperation with the turn table 5. The replay unit 2 which has been released from its locked state becomes a state in which it can move within a certain limit defined by the vibration-isolating members 3 and 4.

By rotating the turn table 5 by means of the first motor not shown in the figures and disposed in the replay unit 2, the disk device rotates the disk 6 sandwiched between the clamper 8 and the turn table 5 and then reads data from the recording surface of the disk 6 rotating by means of the optical pickup not shown in the figures.

When vibrations from outside are applied to the replaying unit 2 which has been released from its locked state, the disk 6 can be brought into contact with the cushion 10 connected to the upper surface of the motor 9. Thus, the cushion 10 can keep the disk 6 from immediate contact with the motor 9 to prevent the disk 6 from being scratched.

While the prior art disk device which is so constructed as mentioned above makes it possible to keep the disk 6 from immediate contact with the motor 9 by virtue of the cushion 10 to prevent the disk 6 from being scratched, it suffers from a problem in that the cushion increases the component count of the disk device and mounting the cushion to the motor causes a decrease in the productivity in the process of assembling the disk device.

SUMMARY OF THE INVENTION

The present invention is made to overcome the above problem. It is therefore an object of the present invention to provide a disk device able to prevent a disk placed therein from being scratched due to a contact between the disk and a motor for driving a carrying system for carrying the disk, thereby preventing a decrease in the productivity in the process of assembling the disk device.

In accordance with the present invention, there is provided a disk device comprising a chassis, a replay unit for supporting a disk placed within the chassis, rotating the disk supported, and reading data from the disk rotating, a vibration-isolating unit for holding the replay unit by connecting the replay unit to the chassis, and for isolating the replay unit from vibrations, a carrying unit for carrying the disk between a disk inlet and outlet formed on the chassis and a replay position where the disk is to be fixed in the replay unit, a motor for driving the carrying unit, and a flexible printed circuit (FPC) mounted to one lateral surface of the motor and electrically connected to the motor. The FPC has a projecting portion which is projected from an upper surface of the motor toward one surface of the disk fixed in the replay unit. Wherein when the disk moves closer to the motor, the projecting portion of the FPC is brought into contact with the disk to prevent the disk from coming into contact with the motor.

In accordance with a preferred embodiment of the present invention, a part of the projecting portion of the FPC which is brought into contact with the disk is a flat surface. Preferably, the projecting portion of the FPC is shaped like a rectangle.

In accordance with another preferred embodiment of the present invention, the projecting portion of the FPC has a pointed top which is brought into contact with the disk when the disk moves closer to the motor. Preferably, the projecting portion of the FPC is shaped like a triangle.

In accordance with another preferred embodiment of the present invention, the projecting portion of the FPC has an upper surface which is inclined such that it extends and rises from the side of the center of the disk to the side of the periphery of the disk, and which is brought into contact with the periphery of the disk when the disk moves closer to the motor.

Further objects and advantages of the present invention will be apparent from the following description of the preferred embodiments of the invention as illustrated in the accompanying drawings.

DETAILED DESCRIPTION OF THE PREFERRED EMBODIMENTS

Figure 1:
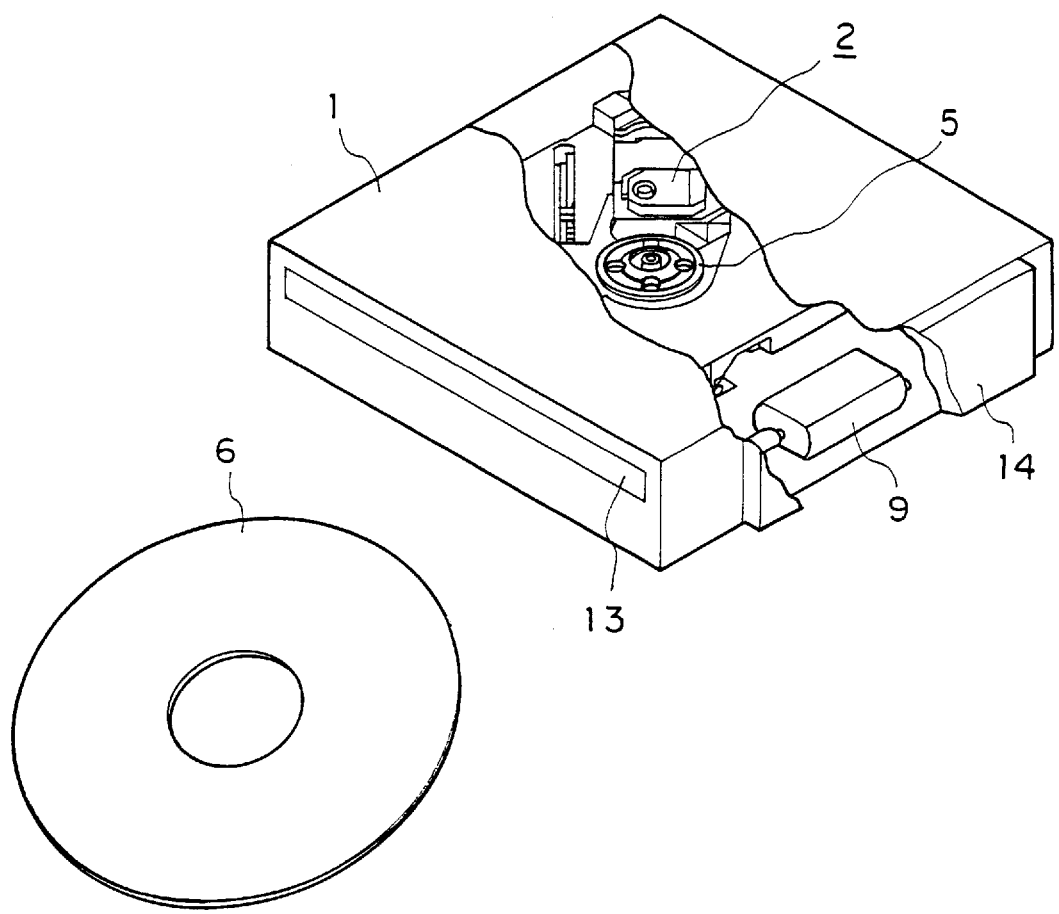
FIG. 1 is a perspective view of a disk device according to the present invention.

Referring now to FIG. 1, there is illustrated a perspective view of a disk device according to a first embodiment of the present invention. In FIG. 1, 1 denotes a chassis in which internal components of the disk device are mounted, and 2 denotes a replay unit mounted within the chassis 1. The replay unit 2 is held in its locked state wherein it is secured to the chassis 1 by a locking system not shown in the figure except when a disk 6 is replayed. When the disk 6 is replayed, the replay unit 2 is brought to a state in which it can move within a certain limit defined by vibration-isolating members 3 and 4. The replay unit 2 serves to hold the disk 6 in a rotatable state, rotate the disk 6 by means of a first motor not shown in the figure, and read data from the disk 6 rotating by means of an optical pickup not shown in the figure.

In addition, reference numeral 5 denotes a turn table which is located in the vicinity of the center of the replay unit. The turn table 5 holds the disk 6 in cooperation with a damper 8 while the center of the turn table 5 is coincident with the center of the disk 6. Then, the turn table 6 that is driven by the motor rotates the disk 6. The disk 6 is shaped like a circle and has a recording surface which contains recording tracks which serve as a storage area. Reference numeral 9 denotes a second motor for driving a carrying unit not shown in the figure for carrying the disk 6, and for actuating a cam 14 of the locking system. The cam 14 of the locking system which is actuated by the second motor 9 serves to release the locked state of the replay unit 2 in which it is secured to the chassis 1. Furthermore, reference numeral 13 denotes a disk inlet and outlet formed on one lateral surface of the chassis 1, through which the disk 6 is inserted into the chassis.

Figure 2:
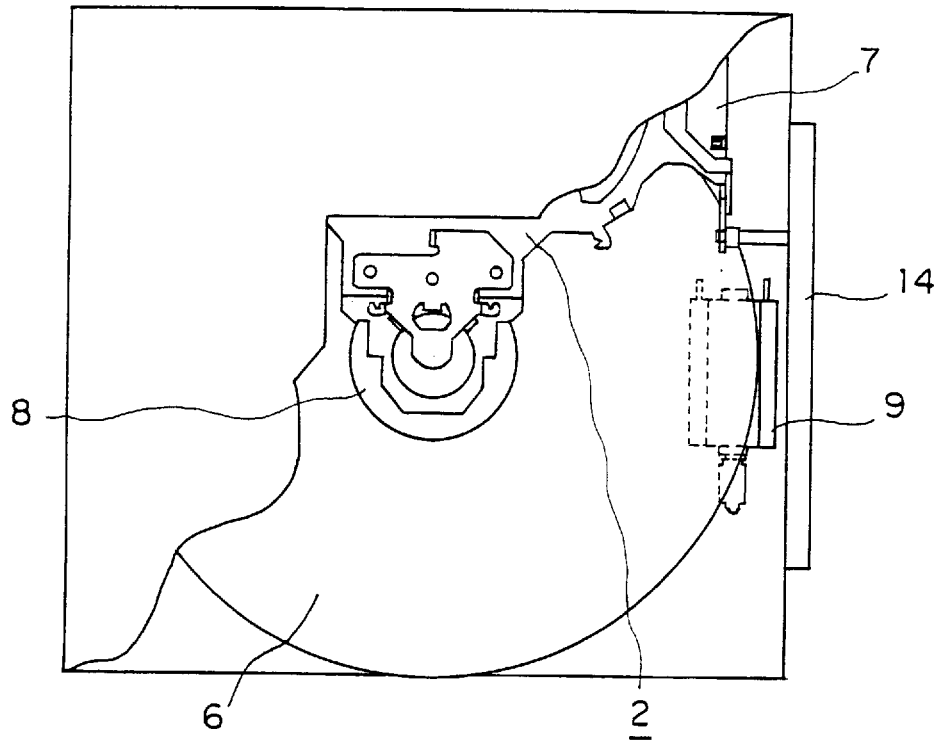
FIG. 2 is a top view, partly cutaway, of the disk device according to the present invention in a state wherein a disk placed within the device is fixed.

Referring next to FIG. 2, there is illustrated a top view, partly cutaway, of the disk device of the first embodiment of the present invention in a state wherein the disk 6 is fixed. In the figure, reference numeral 7 denotes a clamper arm rotatably fixed to a supporting shaft disposed at one end of the replay unit 2. The damper 8 that is loosely engaged in the damper arm 7 can sandwich the disk 6 between the damper 8 and the turn table 5 so as to hold the disk 6 in a rotatable state.

Figure 3:
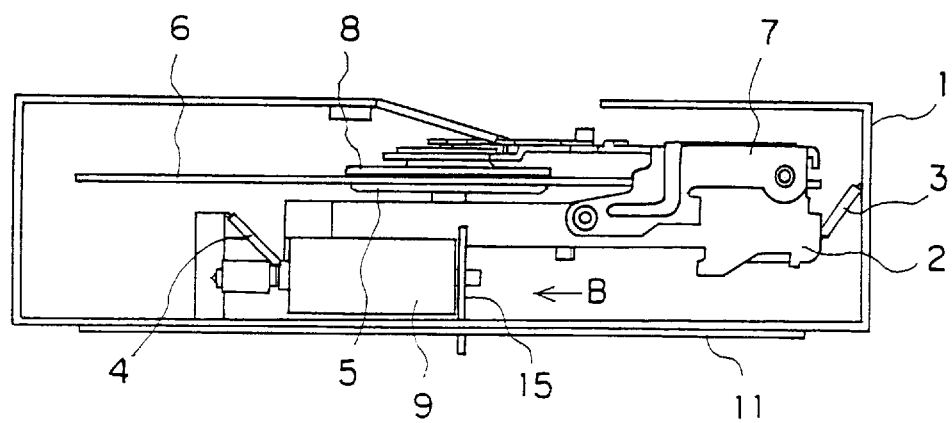
FIG. 3 is a sectional side view in elevation of the disk device according to the present invention in a state wherein a disk placed within the device is fixed and no vibrations from outside are applied to the disk device.

Referring next to FIG. 3, there is illustrated a sectional side view in elevation of the disk device of the first embodiment of the present invention in a state wherein the disk 6 is fixed. Each of the vibration-isolating members 3 and 4 is comprised of a spring and a damper, and they connect the chassis 1 to the replay unit 2. Thus, during a replay of the disk 6, they can hold the replay unit 2 in a state in which the replay unit can move within a certain limit defined by the vibration-isolating members 3 and 4 so as to isolate the replay unit 2 from vibrations from outside. At all other cases, the replay unit 2 is secured to the chassis 1 by the locking system not shown in the figure.

In addition, reference numeral 11 denotes a circuit board including a control circuit used for controlling the disk device, and 15a denotes a flexible printed circuit (FPC) for electrically connecting the circuit board 11 to the second motor 9. The FPC 15a is secured to one lateral surface of the motor 9. The FPC projects from the upper surface of the motor 9 so that the projecting part of the FPC 15a located between the motor 9 and the disk 6 is brought into contact with the disk 6 first when the disk 6 moves closer to the motor 9. Thus, the FPC 15a of the present invention take the place of the prior art cushion mentioned above.

Figure 4:
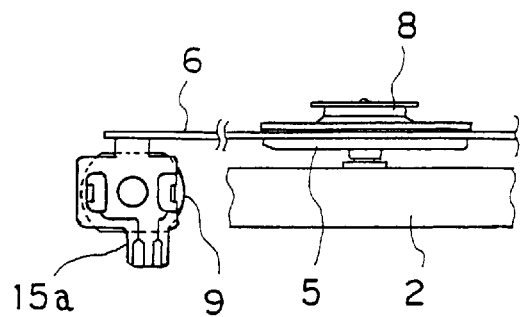
FIG. 4 is a partial side view showing a contact between an FPC of a disk device of a first embodiment of the present invention and the disk.

Referring next to FIG. 4, there is illustrated a partial side view showing the FPC of the disk device of the first embodiment of the present invention, when viewed from the direction shown by the arrow B in FIG. 3. As shown in the figure, the flexible printed circuit 15a of this embodiment has a projecting portion shaped like a rectangle. FIG. 4 shows that the rectangle-shaped projecting portion of the FPC, which projects from the upper surface of the second motor 9, is brought into contact with the recording surface of the disk 6 first so as to prevent the disk 6 from coming immediate contact with the motor 9 when vibrations from outside are exerted on the replay unit 2.

In operation, when the disk 6 is inserted via the disk inlet and outlet 13, the carrying unit that is driven by the second motor 9 carries the disk 6 to a predetermined position on the turn table 5. Then, when the disk 6 is fixed at the predetermined position on the turn table 5, the motor 9 drives the cam of the locking system so as to release the locked state of the replay unit 2 in which it is secured to the chassis 1. As the same time that the replay unit 2 is released from its locked state wherein it is secured to the chassis 1, the clamper 8 holds the disk 6 in cooperation with the turn table 5. The replay unit 2 which has been released from its locked state becomes a state in which it can move within a certain limit defined by the vibration-isolating members 3 and 4.

By rotating the turn table 5 by means of the first motor not shown in the figures and disposed in the replay unit 2, the disk device rotates the disk 6 sandwiched between the clamper 8 and the turn table 5 and then reads data from the recording surface of the disk 6 rotating by means of the optical pickup not shown in the figures.

When vibrations from outside are applied to the replaying unit 2 which has been released from its locked state, the disk 6 can be brought into contact with the FPC 15a mounted to one lateral surface of the motor 9. More specifically, the flat surface of the most upper edge of the rectangle-shaped projecting portion of the FPC 15a is contact with the recording surface of the disk 6 at a peripheral portion thereof, as shown in FIG. 4. Since the part of the FPC 15a that is contact with the recording surface of the disk 6 is thus the flat surface of the most upper edge of the rectangle-shaped projecting portion of the FPC 15a, the pressure exerted on the recording surface of the disk 6 by the contact is dispersed over the part of the recording surface of the disk which is contact with the flat surface of the edge of the projecting portion of the FPC 15a. Thus, the FPC 15a can keep the disk 6 from immediate contact with the motor 9 to prevent the disk 6 from being scratched.

As previously explained, according to the first embodiment of the present invention, the FPC 15a, which is only one component of the disk device, serves as a lead line for electrically connecting the circuit board 11 to the motor 9 and a cushion. Accordingly, the FPC can reduce the component count of the disk device. Furthermore, since the process of attaching the cushion to the motor can be eliminated, productivity in the process of assembling the disk device can be increased. Furthermore, since all the surfaces of the rectangle-shaped projecting portion of the FPC 15a are flat, the FPC can be formed easily. This results in further increasing productivity in the process of assembling the disk device. In addition, the FPC 15a can keep the disk 6 from immediate contact with the motor 9 when the disk makes closer to the motor 9. And, since the part of the FPC 15a that is contact with the recording surface of the disk 6 is the flat surface of the most upper edge of the rectangle-shaped projecting portion of the FPC 15, the pressure exerted on the recording surface of the disk 6 by the contact is dispersed over the part of the recording surface of the disk which is contact with the flat surface of the edge of the projecting portion of the FPC 15a. Accordingly, the FPC 15a can prevent the disk 6 from being scratched.

Figure 5:
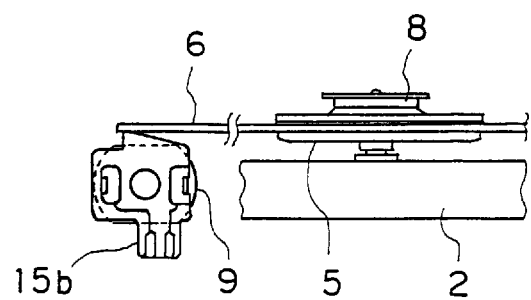
FIG. 5 is a partial side view showing a contact between an FPC of a disk device of a second embodiment of the present invention and the disk.

Referring next to FIG. 5, there is illustrated a partial side view showing the FPC of a disk device of a second embodiment of the present invention, when viewed from the direction shown by the arrow B in FIG. 3. The structure other than the FPC of the second embodiment is the same as that shown in FIGS. 1 to 3 of the above-mentioned first embodiment, and therefore the description about the structure will be omitted hereinafter. As shown in FIG. 5, the flexible printed circuit 15b of this embodiment has a projecting portion shaped like a triangle and having a pointed top. FIG. 5 shows that the triangle-shaped projecting portion of the FPC, which projects from the upper surface of the motor, is brought into contact with the recording surface of the disk 6 first so as to prevent the disk 6 from coming immediate contact with the motor 9 when vibrations from outside are exerted on the replay unit 2.

In operation, when vibrations from outside are applied to the replaying unit 2 which has been released from its locked state, the disk 6 can be brought into contact with the FPC 15b mounted to one lateral surface of the motor 9. At that time, the pointed top of the triangle-shaped projecting portion of the FPC 15b is contact with the recording surface of the disk 6 at a peripheral portion thereof, as shown in FIG. 5. Thus, the FPC 15b can keep the disk 6 from immediate contact with the motor 9 to prevent the disk 6 from being scratched. Furthermore, even though the disk 6 is scratched by the FPC 15b, since the part of the FPC 15b that is contact with the recording surface of the disk 6 is only a spot, i.e., a very small flat surface, the contact area of the disk 6 that is contact with the pointed top of the FPC 15b is minimized and hence the scratched area of the disk 6 is minimized. In addition, since the area of the disk 6 which can be scratched by the top of the triangle-shaped projecting portion of the FPC 15b can be within a peripheral area of the recording surface on which there does not exist data, the recording surface of the disk can be prevented from being scratched.

As previously explained, according to the second embodiment of the present invention, the FPC 15b, which is one component of the disk device, serves as a lead line for electrically connecting the circuit board 11 to the motor 9, and a cushion. Accordingly, the FPC can reduce the component count of the disk device. Furthermore, since the process of attaching the cushion to the motor can be eliminated, productivity in the process of assembling the disk device can be increased. Furthermore, since all the surfaces of the triangle-shaped projecting portion of the FPC 15b are flat, the FPC can be formed easily. This results in further increasing productivity in the process of assembling the disk device. In addition, the FPC 15b can keep the disk 6 from immediate contact with the motor 9 when the disk makes closer to the motor 9. And, even though the disk 6 is scratched by the FPC 15b, since the part of the FPC 15b that is contact with the recording surface of the disk 6 is only a spot, the contact area of the disk 6 that is contact with the pointed top of the FPC 15b is minimized and hence the scratched area of the disk 6 is minimized. In addition, since the area of the disk 6 which can be scratched by the top of the triangle-shaped projecting portion of the FPC 15b can be within a peripheral area of the recording surface on which there does not exist data, the recording surface of the disk can be prevented from being scratched.

Figure 6:
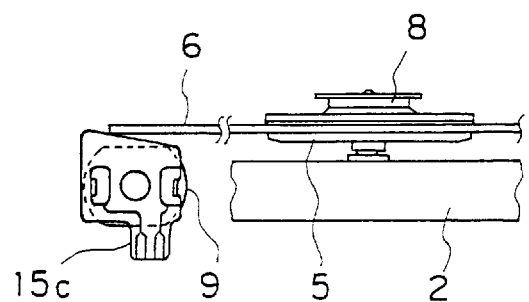
FIG. 6 is a partial side view showing a contact between an FPC of a disk device of a third embodiment of the present invention and the disk.
Figure 7:
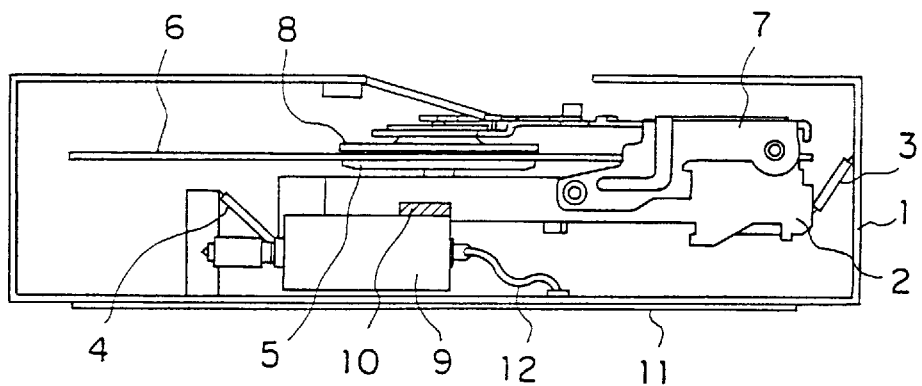
FIG. 7 is a sectional side view in elevation of a prior art disk device wherein a disk placed within the device is fixed and no vibrations from outside are applied to the disk device.
Figure 8:
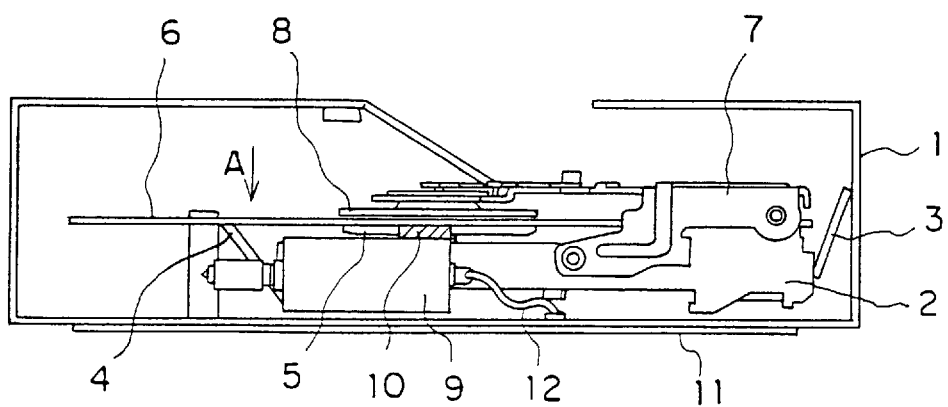
FIG. 8 is a sectional side view of the prior art disk device in a state wherein a disk placed therein is clamped and the disk is contact with a cushion stick onto a motor due to vibrations from outside applied to the disk device.

Referring next to FIG. 6, there is illustrated a partial side view showing the FPC of a disk device of a third embodiment of the present invention, when viewed from the direction shown by the arrow B in FIG. 3. The structure other than the FPC of the third embodiment is the same as that shown in FIGS. 1 to 3 of the above-mentioned first embodiment, and therefore the description about the structure will be omitted hereinafter. As shown in FIG. 6, the flexible printed circuit 15c of this embodiment has a projecting portion including an upper edge having a flat surface which is inclined such that one end of the edge on the side of the periphery of the disk 6 is higher than the other end of the edge on the side of the center of the disk 6. That is, the edge extends and rises from the side of the center of the disk to the side of the periphery of the disk. FIG. 6 shows that the inclined edge of the projecting portion of the FPC 15c, which projects from the upper surface of the motor, is brought into contact with the periphery of the disk 6 first so as to prevent the disk 6 from coming immediate contact with the motor 9 when vibrations from outside are exerted on the replay unit 2.

In operation, when vibrations from outside are exerted on the replaying unit 2 which has been released from its locked state, the disk 6 can be brought into contact with the FPC 15c mounted to one lateral surface of the motor 9. At that time, the inclined, flat surface of the upper edge, which is sloped such that it rises from the side of the center of the disk 6 to the side of the periphery of the disk 6, of the projecting portion of the FPC 15c is contact with the periphery of the disk 6, as shown in FIG. 6. Thus, the FPC 15c can keep the disk 6 from immediate contact with the motor 9 to prevent the disk 6 from being scratched. Furthermore, since the inclined, flat surface of the sloped, upper edge of the projecting portion of the FPC 15c is contact with the periphery of the disk 6, the recording surface of the disk can be prevented from being scratched.

As previously explained, according to the third embodiment of the present invention, the FPC 15c, which is one component of the disk device, serves as a lead line for electrically connecting the circuit board 11 to the motor 9, and a cushion. Accordingly, the FPC of this embodiment can reduce the component count of the disk device. Furthermore, since the process of attaching the cushion to the motor can be eliminated, productivity in the process of assembling the disk device can be increased.

Furthermore, the FPC 15c can keep the disk 6 from immediate contact with the motor 9 to prevent the disk 6 from being scratched. In addition, since the inclined, flat surface of the sloped, upper edge of the projecting portion of the FPC 15c is contact with the periphery of the disk 6, the recording surface of the disk can be prevented from being scratched. Furthermore, since the inclined surface of the sloped edge of the projecting portion of the FPC 15c is flat, even though a force in a horizontal direction in FIG. 6 is exerted on the replay unit 2, the edge does not hinder the disk from moving smoothly in a horizontal direction. Accordingly, the sloped edge of the projecting portion of the FPC 15c of this embodiment does not have a deleterious effect on the function of the vibration-isolating members 3 and 4.

As previously explained, the present invention offers the following advantages.

In accordance with a preferred embodiment, there is provided a disk device comprised an FPC as a single component of the device, which serves as a lead line for electrically connecting a motor for driving a carrying system to a control circuit board, and a cushion. Accordingly, the embodiment can reduce the component count of the disk device. Furthermore, since the process of attaching the cushion to the motor can be eliminated, productivity in the process of assembling the disk device can be increased. In addition, the FPC can keep the disk from immediate contact with the motor so as to prevent the disk from being scratched due to a contact between the motor and the disk even though vibrations from outside are applied to the disk device.

Preferably, the part of the projecting portion of the FPC that is contact with the disk is a flat surface of the FPC. Accordingly, the pressure exerted on one surface of the disk by the contact is dispersed over the part of the surface of the disk which is contact with the flat surface of the projecting portion of the FPC. Thus, the FPC can prevent the disk from being scratched.

Furthermore, the projecting portion of the FPC is shaped like a rectangle. Therefore, since all the surfaces of the projecting portion can be formed to be flat, the FPC can be formed easily. In addition, productivity in the process of assembling the disk device can be further increased.

In accordance with another preferred embodiment of the present invention, the projecting portion of the FPC is formed such that the part thereof that is contact with the disk fixed in the replay unit is only a spot, i.e., a small flat surface. This makes it possible to bring the projecting portion of the FPC into contact with an area of a peripheral part of the disk where there does not exist data. Accordingly, the recording surface of the disk can be prevented from being scratched. Preferably, the projecting portion of the FPC is shaped like a triangle. Therefore, since all the surfaces of the triangle-shaped projecting portion of the FPC can be flat, the FPC can be formed easily. This results in further increasing productivity in the process of assembling the disk device.

In accordance with another preferred embodiment of the present invention, the projecting portion of the FPC has an upper surface which is inclined such that it extends and rises from the side of the center of the disk to the side of the periphery of the disk, and which is brought into contact with the periphery of the disk when the disk moves closer to the motor. Accordingly, the recording surface of the disk can be prevented from being scratched.

Many widely different embodiments of the present invention may be constructed without departing from the spirit and scope of the present invention. It should be understood that the present invention is not limited to the specific embodiments described in the specification, except as defined in the appended claims.

What is claimed is:

1. A disk device comprising:

a chassis;

a replay means for supporting a disk placed within said chassis, rotating the disk supported, and reading data from the disk rotating;

a vibration-isolating means for holding said replay means by connecting said replay means to said chassis, and for isolating said replay means from vibrations, a carrying means for carrying the disk between a disk inlet and outlet formed on the chassis and a replay position where the disk is to be fixed in said replay means;

a motor for driving said carrying means; and a flexible printed circuit (FPC) mounted to one lateral surface of said motor and electrically connected to said motor, and having a projecting portion which is projected from an upper surface of said motor toward one surface of the disk fixed in said replay means, and wherein, when the disk moves closer to said motor, the projecting portion of said FPC is brought into contact with the disk to prevent the disk from coming into contact with said motor.

2. The disk device according to claim 1, wherein a part of the projecting portion of said FPC which is brought into contact with the disk is a flat surface.

3. The disk device according to claim 2, wherein the projecting portion of said FPC is shaped like a rectangle.

4. The disk device according to claim 1, wherein the projecting portion of said FPC has a pointed top which is brought into contact with the disk when the disk moves closer to said motor.

5. The disk device according to claim 4, wherein that the projecting portion of said FPC is shaped like a triangle.

6. The disk device according to claim 1, wherein the projecting portion of said FPC has an upper surface which is inclined such that it extends and rises from the side of the center of the disk to the side of the periphery of the disk, and which is brought into contact with the periphery of the disk when the disk moves closer to said motor.

\* \* \* \* \*